United States Patent [19]
Bouck

[11] 3,957,116
[45] May 18, 1976

[54] FLUID FLOW CONTROL IN WATERFLOOD
[75] Inventor: Larry S. Bouck, Tulsa, Okla.
[73] Assignee: Cities Service Company, Tulsa, Okla.
[22] Filed: May 19, 1975
[21] Appl. No.: 578,450

[52] U.S. Cl. ............................... 166/245; 166/269; 166/273
[51] Int. Cl.² ........................................ E21B 43/22
[58] Field of Search ........... 166/273, 274, 269, 258, 166/245, 263

[56]         References Cited
         UNITED STATES PATENTS

| | | | |
|---|---|---|---|
| 2,272,673 | 2/1942 | Kennedy | 166/273 |
| 2,988,142 | 6/1961 | Maly | 166/273 |
| 3,208,517 | 9/1965 | Binder, Jr. et al. | 166/274 |
| 3,253,652 | 5/1966 | Connally, Jr. et al. | 166/245 |
| 3,294,164 | 12/1966 | Hardy et al. | 166/274 |
| 3,517,744 | 6/1970 | Horton | 166/245 |
| 3,667,545 | 6/1972 | Knight | 166/269 |
| 3,718,187 | 2/1973 | Milton, Jr. | 166/274 |
| 3,866,680 | 2/1975 | Dauben | 166/274 |

*Primary Examiner*—Stephen J. Novosad
*Attorney, Agent, or Firm*—A. Joe Reinert

[57]         ABSTRACT

In displacement processes for recovery of liquid hydrocarbons from a hydrocarbon bearing formation having zones of different permeability wherein such displacement processes comprise injecting a drive fluid through an injection well vertically traversing the formation and recovering by means of a production well the liquid hydrocarbons which are displaced by the injection of the drive fluid; this invention involves an improvement comprising injecting a water insoluble liquid into the permeable zone to increase drive efficiency in the less permeable zone.

10 Claims, 1 Drawing Figure

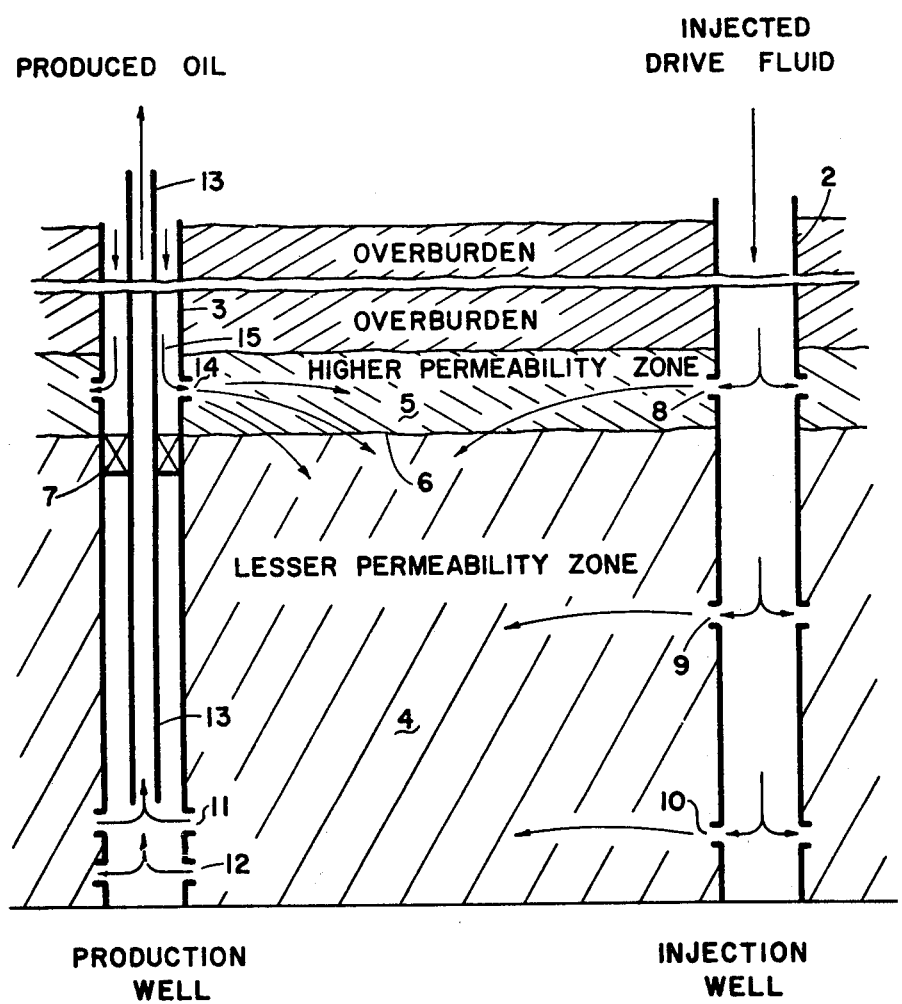

FLUID FLOW CONTROL IN WATERFLOOD

BACKGROUND OF THE INVENTION

1. Field of the Invention

The invention relates to fluid drive processes for the recovery of hydrocarbons from hydrocarbon-containing subterranean formations. In one more specific aspect, it relates to an improvement wherein selective drive through more permeable as opposed to less permeable zones of a formation is corrected.

2. Description of the Prior Art

Processes for the recovery of liquid hydrocarbons from a hydrocarbon-bearing subterranean formation by injection of a drive fluid through an injection well vertically traversing the formation and recovery from a production well of displaced liquid hydrocarbons are well known to those skilled in the art. Particularly, waterflooding processes of this type are well known as are waterflooding processes involving the use of surfactants and thickening polymers.

It is also well known to those skilled in the art that many formations are not adequately flooded out employing these methods because the formation is not of uniform permeability. Often, the drive fluid will channel through a highly permeable zone between an injection well and a producing well leaving much of the residual oil unaffected by the flooding procedure.

One mitigation of the problem is disclosed by U.S. Pat. No. 3,667,545 wherein the boundary zone of a lesser permeable zone adjoining a more highly permeable zone is injected between an injection and a production well with a mobility reducing agent. This procedure allows differential injection into the lesser permeable zone as opposed to the highly permeable zone, and is proposed to increase recovery by this means.

However, in spite of such developments, more effective means of carrying out more efficient flooding with drive fluids are earnestly sought after in order to increase economically recoverable reserves of hydrocarbons.

SUMMARY OF THE INVENTION

It has been discovered that injecting a water insoluble liquid into a permeable zone mitigates channeling of a drive fluid through the permeable zone wherein the drive is conducted through a formation containing zones of various permeabilities and vertically traversed by an injection well and a production well.

BRIEF DESCRIPTION OF THE DRAWING

The FIGURE of the drawing illustrates a cross section of a subterranean reservoir having an upper more highly permeable zone and a lower less permeable zone with an injection well and a production well vertically traversing the formation.

DESCRIPTION OF THE DRAWING

The drawing illustrates a cross-section of a hydrocarbon-bearing permeable subterranean formation having injection well 2 fluid communication with production well 3 via a higher permeability zone 5 and a lesser permeability zone 4, the juncture of the zones of different permeability at 6. Drive fluid is injected into the formation through injection well 2 through perforations 8, 9, and 10 into both the higher permeability zone 5 and the lesser permeability zone 4. Hydrocarbons displaced by the drive fluid are produced from the production well 3 through tubing 13, and enter the well through perforations 11 and 12. A water insoluble liquid is injected through perforation 14 from the production well 3 through its annulus 15 which is separated from tubing 13 by packer 7, to redirect the sweep of the drive fluid into the lesser permeability zone 4.

PREFERRED EMBODIMENTS OF THE INVENTION

In order to redirect the sweep of a drive fluid into a lesser permeable zone and increase sweep efficiency in a process for recovery of hydrocarbons from a hydrocarbon bearing formation having a first zone of higher permeability than a second zone of lower permeability wherein the process comprises injecting a drive fluid through an injection well vertically traversing the formation and recovering from a production well the liquid hydrocarbons which are displaced by the drive fluid, an improvement comprising injecting a water insoluble liquid into the upper permeable zone is provided.

According to a presently preferred embodiment, the first zone of higher permeability overlies the second zone of lower permeability, the drive fluid is an aqueous drive fluid, the water insoluble liquid which is injected into the higher permeability zone is petroleum or a petroleum derived hydrocarbon and the injection into the higher permeability zone is from a production well.

Suitable water insoluble liquids which can be employed include petroleum, such as oil which is produced from a production well and recycled, a distillate or other derivative of petroleum such as heavy paraffine fractions heavy asphaltic fractions, diesel fuel, fuel oils, alkylates, alkylate residues, and the like. If desired, other oil insoluble liquids such as silicone liquids, fluorocarbon liquids, and the like can be employed.

It is presently preferred that the water insoluble liquid be injected from the production well by a packer therein so that the injection takes place into the higher permeability zone. Injection of the water insoluble liquid is presently preferred to be concurrent with injection of an aqueous drive fluid from the injection well.

The drive fluid which is injected through the injection well can be any conventional drive fluid such as natural gas, carbon monoxide, water, brines, propane, $CO_2$, air, and the like. It is presently preferred that the drive fluid be an aqueous solution such as a brine solution. It is particularly preferred that the drive fluid be thickned in at least a leading portion with a polymer thickening agent such as a hydroxylated or methoxylated cellouse product, a partially hydrolized polyacrylamide or certain bacterial fermentation products of a polysaccharide character which are known to be useful for this purpose.

It is also within the scope of this invention to employ a surfactant within the frontal portion of the drive fluid. According to one preferred embodiment, the frontal portion of an aqueous drive fluid has a slug of thickening polymer and a surfactant mixture, such as a micellar solution incorporated therein. Many exemplifications of such surfactant floods of both a micellar nature and otherwise with varying incorporation of various polymers are well known to those skilled in the art.

The production well and injection well can be employed in any conventional spatial relationship within a field.

Thus, according to one presently preferred embodiment, the injection well is the center well in a conventional five-spot pattern and a plurality of production wells comprise the other four wells of the five-spot pattern. The five-spot pattern comprises four production wells at the corners of a square, from an overhead view, with the injection well as the center well within the square, leaving a pattern similar to the five-spot pattern found on dice or dominos.

The process of the instant invention can also be employed wherein the injection well is the center well of a conventional nine-spot pattern and the production wells are outlying. This configuration involves each of four production wells, from an overhead view, lying at the corners of a square with each of four additional production wells lying on a line and centered between each of the two corner wells, and the injection well centered in the square.

The process can also be employed in a conventional line-drive configuration wherein a line of injection wells displace oil toward a line of production wells in a more or less straight line.

It is within the scope of this invention to inject water insoluble liquid into a multiplicity of higher permeability zones when the fluid drive sweeps a formation having a multiplicity of such higher permeability zones. This improved process is particularly advantageous, however, when the higher permeability zone overlies a zone of lesser permeability and wherein the water insoluble liquid has a lesser density than the drive fluid employed.

The improved process can be advantageously employed in both carbonate and sandstone formations. It is particularly advantageous in sandstone formations.

In order to more fully explain the present invention, the following examples of how to carry it out are given. However, it is to be understood that these examples are not intended to function as limitations on the invention as described and claimed herein.

EXAMPLES

To illustrate the invention: a center injection well and four outlying production wells in a five-spot configuration are drilled and completed into a formation at about 4500 feet of depth. The formation is 17 feet thick and has a 1 foot higher permeability zone which has considerably higher permeability than the rest of the formation. The production wells are completed with packers as shown in the drawing to provide for injection of produced oil into the upper higher permeability zone. The formation has previously been produced to its economic extent by conventional primary recovery operations.

Waterflood operations previously attempted in the field have been unsatisfactory because of the brine drive channeling through the upper highly permeable zone.

Concurrent with injection of a brine drive fluid into the center injection well, produced oil is injected into the upper highly permeable zone from the production wells.

Over the life of the resulting waterflood, recovery is greatly enhanced over comparable operations wherein oil is not injected from the production wells into the upper highly permeable zone.

A number of computer runs on simulated reservoir models were made and these runs have demonstrated very substantially improved recoveries wherein water-insoluble fluids are injected into permeable zones from production wells in brine flood operations.

What is claimed is:

1. In a process for recovery of liquid hydrocarbons from a hydrocarbon-bearing formation having a first zone of higher permeability than a second zone of lower permeability comprising:
   a. injecting a drive fluid through an injection well vertically traversing the formation, and
   b. recovering liquid hydrocarbons which are displaced by the drive fluid from a production well vertically traversing the formation;
the improvement comprising:
   c. injecting a water insoluble liquid into the first zone of higher permeability
wherein:
   d. the first zone of higher permeability is an upper zone overlying the second zone of lower permeability,
   e. the drive fluid is an aqueous drive fluid,
   f. the water insoluble liquid of (c) is petroleum or a petroleum-derived hydrocarbon, and
   g. the insoluble liquid of (c) is injected into the upper permeable zone from the production well.

2. The process of claim 1 wherein the injection of the water insoluble liquid of (c) is concurrent with the injection of the drive fluid of (a).

3. The process of claim 1 wherein the injection of the water insoluble liquid of (c) is previous to the injection of the drive fluid of (a).

4. The process of claim 1 wherein the insoluble liquid injected in (c) is produced oil.

5. The process of claim 1 wherein the injection well is the center well in a five-spot configuration and a plurality of production wells are the outlying wells of the five-spot configuration.

6. The process of claim 1 wherein the injection well is the center well and a plurality of production wells are the outlying wells in a nine-spot configuration.

7. The process of claim 1 wherein a plurality of injection wells and a plurality of production wells are situated in a line drive configuration.

8. The process of claim 1 wherein a surfactant is injected in conjunction with a first portion of the aqueous fluid injected in (a).

9. The process of claim 1 wherein a micellar solution and an aqueous solution thickened with a polymer are injected in the frontal portion of the aqueous drive liquid injected in step (a).

10. The process of claim 1 wherein a polymer thickened aqueous mixture is injected in the frontal portion of the aqueous drive fluid injected in step (a).

* * * * *